United States Patent [19]

Köhler

[11] Patent Number: 6,087,428
[45] Date of Patent: Jul. 11, 2000

[54] INSULATION MATERIAL BASED ON POLYVINYL CHLORIDE

[75] Inventor: Rainer Köhler, Leinburg, Germany

[73] Assignee: Alcatel, Paris, France

[21] Appl. No.: 09/199,288

[22] Filed: Nov. 24, 1998

[30] Foreign Application Priority Data

Nov. 27, 1997 [DE] Germany .............................. 197 52 481

[51] Int. Cl.$^7$ ................................ C08J 3/00; C08K 3/00; C08K 5/09; C08K 5/10; C08L 27/06
[52] U.S. Cl. ........................... 524/424; 524/284; 524/401; 524/409; 524/436; 524/437
[58] Field of Search ..................................... 524/284, 401, 524/409, 424, 436, 437

[56] References Cited

U.S. PATENT DOCUMENTS

| 4,272,427 | 6/1981 | Davis et al. . | |
|---|---|---|---|
| 5,036,121 | 7/1991 | Coaker et al. | 524/100 |
| 5,278,218 | 1/1994 | Carette et al. | 524/434 |

FOREIGN PATENT DOCUMENTS

| 0364717 | 4/1990 | European Pat. Off. . |
| 2644079 | 4/1978 | Germany . |
| 2905011 | 8/1980 | Germany . |
| 19711690 | 11/1997 | Germany . |
| 03126748 | 5/1991 | Japan . |
| 1260533 | 1/1972 | United Kingdom . |
| 1519781 | 8/1978 | United Kingdom . |
| 2230255 | 10/1990 | United Kingdom . |
| 9101348 | 2/1991 | WIPO . |
| 9313183 | 7/1993 | WIPO . |

OTHER PUBLICATIONS

German Search Report dated Jul. 16, 1998 for German Patent Application No. 197 52 481.8 filed Nov. 27, 1997.
European Patent Office Search Report dated Mar. 17, 1999 (3 pages).

*Primary Examiner*—Patrick D. Niland
*Attorney, Agent, or Firm*—Ware, Fressola, Van der, Sluys & Adolphson LLP

[57] ABSTRACT

An insulation material that is based on polyvinyl chloride and can be used for cables or wires is disclosed. Additives for flame retardation as well as stabilizers and processing aids are added to the base material. The composition comprises 100 parts polyvinyl chloride, 40 to 60 parts polymer plasticizer (softener), 10 to 50 parts magnesium carbonate, 10 to 50 parts of a metal hydrate, and 5 to 15 parts of a zinc-tin compound. In case of fire, the insulation material emits low amounts of smoke.

5 Claims, No Drawings

INSULATION MATERIAL BASED ON POLYVINYL CHLORIDE

BACKGROUND OF THE INVENTION

1. Technical Field

The invention relates to an insulation material based on polyvinyl chloride for use as a sheathing for long materials, where additives for flame retardation have been added to the base material, as well as stabilizers and processing aids.

2. Description of the Related Art

In the sense of the invention "long" materials could be electrical and optical cables or wires as well as wire conduits. In this case electrical installation wires and so-called plenum cables, which are installed in buildings to supply power to the most diverse users and for transmitting information, are of particular interest. Polyvinyl chloride (PVC) is the insulation material used in most of these wires. Although it has good electrical properties, PVC however has the disadvantage that in case of fire the halogen contained therein is liberated as a hydrogen compound. The PVC decomposes when heavy smoke production takes place. PVC therefore does not fulfill today's requirements for a material that can be used for wires installed in buildings, unless suitable additives are added. In case of fire such insulation material should not release toxic gases and should especially not give off any disabling smoke.

To avoid these disadvantages, filler materials that are able to form acids are added to the insulation material disclosed in GB 1 260 533. The filler materials are for example small particle thermostable metals such as alkaline earth metals. Specially mentioned are magnesium carbonate and calcium carbonate for example. The use of such an insulation material can avoid most of the toxic gas liberation in case of a fire. However the insulation material is able to burn and the development of smoke can therefore not be avoided.

SUMMARY OF THE INVENTION

The object of the invention is to make the insulation material described in the beginning flame retardant and smokeless in a simple manner.

This object is achieved by the present invention by providing a composition comprising: 100 parts polyvinyl chloride; 40 to 60 parts polymer plasticizer; 10 to 50 parts magnesium carbonate; 10 to 50 parts of a metal hydrate; and 5 to 15 parts of a zinc-tin compound.

The invention will be fully understood when referece is made to the following detailed description.

DETAILED DESCRIPTION OF THE INVENTION

The PVC-based insulation material of the present invention is a suitable material which is safe in case of fire. It is particularly flame retardant so that it barely burns even in the presence of an open flame. The redirection of fire, for example in shafts, can therefore be prevented. The simultaneous use of the zinc-tin compound and a suitable metal hydrate ensures furthermore that very little smoke develops in case of fire.

Embodiments of the subject of the invention are explained below. A soft PVC with the code number K70 for example is used as the base material. Suitable metal hydrates are for example aluminum trihydrate or magnesium hydroxide. Zinc stannate or zinc hydroxy stannate can be used as the zinc-tin compounds for example.

The magnesium carbonate and the metal hydrate make the PVC flame retardant. The redirection of fire, for example in a shaft, is avoided. The flame retardation of PVC can be improved further by the addition of 5 to 15 parts of antimony trioxide. In case of fire the zinc-tin compound and the metal hydrate barely allow any smoke to develop. Fire escape paths are therefore easily recognized during a fire.

A particularly well suited insulation material results from the following example:

100 parts polyvinyl chloride;

50 parts polymer plasticizer;

40 parts magnesium carbonate;

40 parts aluminum trihydrate;

10 parts zinc hydroxy stannate;

10 parts antimony trioxide;

5 parts stabilizer; and 1 part stearic acid.

A conventional lead stabilizer can be used for example as the stabilizer. The stearic acid is used as a processing aid. The reference to "parts" herein is ordinarily understood by those skilled in the art to be an abreviation for "parts by weight."

The preferred embodiments described above admirably achieve the object of the present invention. However, it will be appreciated that departures can be made by those skilled in the art without departing from the spirit and scope of the invention which is limited only by the following claims.

What is claimed is:

1. A polyvinyl chloride based insulation material for use as a sheathing for long materials, the insulation material comprising:

100 parts polyvinyl chloride;

40–60 parts polymer plasticizer;

10 to 50 parts magnesium carbonate;

10 to 50 parts metal hydrate; and 5 to 15 parts of a zinc-tin compound selected from the group consisting of zinc stannate and zinc hydroxy stannate.

2. The insulation material as defined in claim 1, wherein the material further comprises 5 to 15 parts of antimony trioxide.

3. The insulation material as defined in claim 1, wherein the metal hydrate is aluminum trihydrate.

4. The insulation material as defined in claim 1, wherein the metal hydrate is magnesium hydroxide.

5. An polyvinyl cholride based insulation material for use as a sheathing for long materials, the insulation material comprising:

100 parts polyvinyl chloride;

50 parts polymer plasticizer;

40 parts magnesium carbonate;

40 parts aluminum trihydrate;

10 parts zinc hydroxy stannate;

10 parts antimony trioxide;

5 parts stabilizer; and 1 part stearic acid.

* * * * *